United States Patent
Gulaian

[11] 3,755,916
[45] Sept. 4, 1973

[54] PLENUM DISCHARGE FACE EMPLOYING HONEYCOMB LAYER

[75] Inventor: Vartan Gulaian, Gates Mills, Ohio

[73] Assignee: Bangor Punta Operations, Inc., Greenwich, Conn.

[22] Filed: Aug. 13, 1971

[21] Appl. No.: 178,517

[52] U.S. Cl............................ 34/105, 34/218, 34/236
[51] Int. Cl............................................. F26b 25/00
[58] Field of Search...................... 34/104, 105, 21, 34/231, 236, 218, 156, 122, 240; 110/18, 340

[56] References Cited
UNITED STATES PATENTS

| | | | |
|---|---|---|---|
| 3,574,952 | 4/1971 | Lee, Jr. | 34/105 |
| 3,276,140 | 10/1966 | Walser et al. | 34/122 |
| 3,163,134 | 12/1964 | Stratford | 110/18 |
| 3,589,033 | 6/1971 | Bryand | 34/240 |
| 2,963,389 | 12/1960 | Winkler | 110/340 |

Primary Examiner—Kenneth W. Sprague
Assistant Examiner—James C. Yeung
Attorney—Patrick J. Walsh

[57] ABSTRACT

An improved nozzle apparatus for convection ovens comprises a honeycomb material layer adapted as the discharge face of a fluid supply plenum to thereby provide a multiplicity of elongated passages or nozzles for directing fluid flow onto products moving through the oven; the fluid flow therefrom being exclusively perpendicular to the direction of product movement. A perforated plate is positioned on the discharge side of the honeycomb material layer to provide desired fluid distribution and flow velocity.

6 Claims, 4 Drawing Figures

Patented Sept. 4, 1973
3,755,916
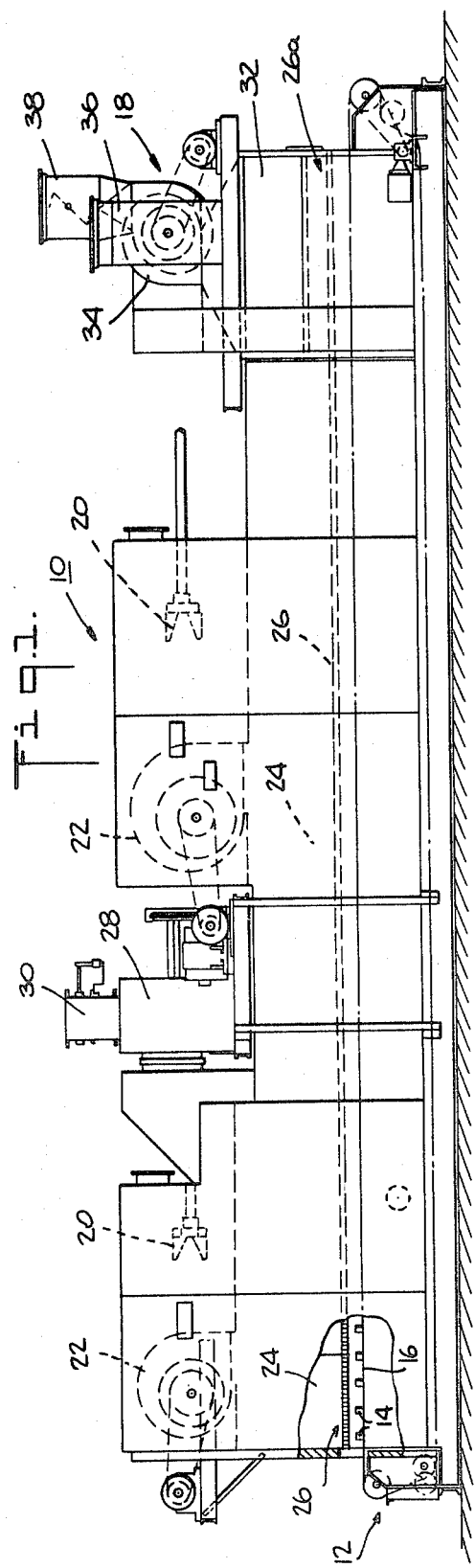
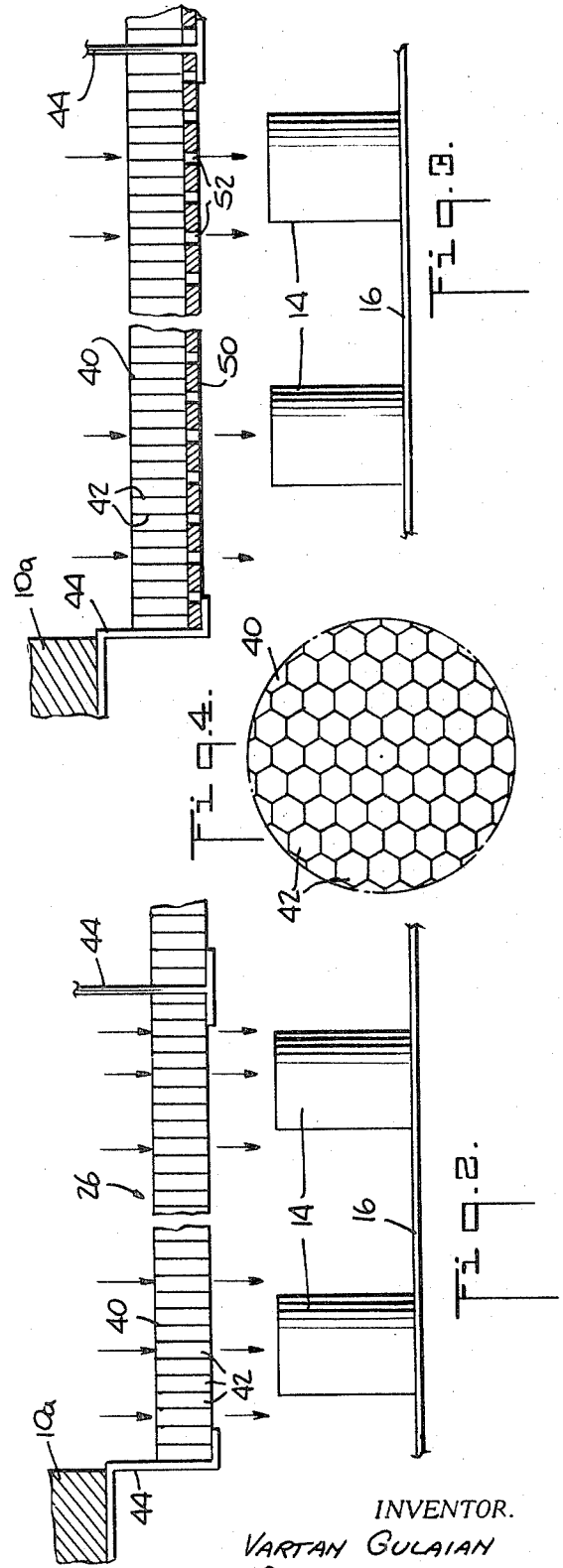
INVENTOR.
VARTAN GULAIAN
BY Patrick J. Walsh
ATTORNEY

PLENUM DISCHARGE FACE EMPLOYING HONEYCOMB LAYER

BACKGROUND OF THE INVENTION

The primary purpose of convection ovens is generally to achieve controlled and uniform transfer of heat to or from products to be treated. One of the principal concerns in using such ovens is the control of the heat transfer medium, typically air, in terms of location, direction, velocity and mass. In some applications however, such as the curing of coatings inside thin walled containers being translated through the oven on a continuous conveyor, an equally important concern is the stability of the product being subjected to the flow of air. The problem of product stability is compounded as can manufacturers go to taller and light cans, particularly those made of aluminum. If the air impinging on a can causes it to tip over, the inside coating thereof is not properly cured and adjacent cans may be knocked over by the upsetting can in "domino" fashion.

In the curing of inside container coatings, the containers are typically placed on a conveyor, open end up, such that their centerlines are normal to the plane of the conveyor and thus normal to their direction of movement through a curing or baking oven. In this situation, container stability is assured only if the air flow is parallel to the container centerlines. Typically, the discharge face of an air supply plenum is positioned parallel to the conveyor and the direction of air flow is normal to this discharge face. As the air velocity is increased to raise the heat transfer rate and thus accommodate the demand for higher production rates and more compact ovens, the necessity for essentially non-turbulent air flow in a direction rather precisely parallel to the container centerlines becomes absolutely essentially.

Convection ovens utilized for curing container coatings typically employ a plate formed with a series of slots or holes as the air supply or plenum discharge face. With this design, air flow essentially normal to the plane of the discharge face is assured only if air flow into the entire plenum is also normal to the plane of the discharge face, when the plenum approaches relatively infinite size, or when one or more substantial pressure drops are incorporated to obtain uniform packing of the plenum ahead of the slots or holes in the discharge face. These conditions are costly to create and, in some situations, inappropriate due to the size limitations imposed on current convection oven designs. Compromise design approaches have involved adding sidewalls to the slots or holes in the air discharge plate extending perpendicular to the plane thereof. However, this approach does not eliminate components of air flow in the plane of the slots. Alternatively, elongated tubes, cones or other hollow members extending from the plenum discharge face and communicating with the spaced openings therein have been provided. This design approach involves considerable expense.

It is accordingly a general object of the present invention to provide nozzle apparatus adapted as the discharge face of a fluid supply plenum which provides essentially laminar, non-turbulent air flow in a direction essentially normal to the discharge face, and yet is simple in design, inexpensive to manufacture, and readily retrofitted to existing convection ovens.

SUMMARY OF THE INVENTION

In accordance with the present invention, there is provided in improved nozzle apparatus in the form of a layer of honeycomb material adapted as the discharge face of a fluid supply plenum. The honeycomb material provides a multiplicity of elongated air passages or nozzles effective to controllably direct the air flow therefrom in a direction which is rather precisely normal to the plane of the plenum discharge face. The thickness of the honeycomb material layer is such as to provide individual nozzles of sufficient length not only to exert adequate directional control on the air flow therethrough, but also to render the air flow essentially non-turbulent or laminar.

By virtue of this design, products such as containers moving on a conveyor whose plane is parallel to the plane of the honeycomb material layer can be subjected to essentially non-turbulent air flow of a controlled direction rather precisely normal to the conveyor plane and thus parallel to the container centerline. As a consequence, higher masses and velocities of air flow can be accommodated before reaching container instability than has been heretofore economically possible. As a result, increased heat transfer and purging rates, and thus higher proudction rates are economically achieved. Moreover, the nozzle apparatus of the present invention is compact, and thus is compatible with convection ovens of compact design.

Preferably, in accordance with the present invention, a plate is adapted to the discharge side of the honeycomb material layer and is provided with a series of slots or holes communicating with the individual nozzles or passages of the honeycomb material layer. The slots or holes are distributed throughout the plate and are appropriately sized so as to achieve proper air distribution over the plenum discharge face and desired velocity of air flow therefrom.

The invention accordingly comprises the features of construction, combinations of elements, and arrangement of parts which will be exemplified in the constructions hereinafter set forth, and the scope of the invention will be indicated in the claims.

For a fuller understanding of the nature and objects of the invention, reference should be had to the following detailed description taken in connection with the accompanying drawing in which:

FIG. 1 is a side elevational view, partially broken away, of a convection oven adapted with nozzle apparatus of the present invention;

FIG. 2 is a fragmentary side elevational view of one embodiment of the nozzle apparatus of the present invention employing a layer of honeycomb material;

FIG. 3 is a fragmentary side elevational view of a nozzle apparatus constructed according to an alternative embodiment of the invention employing a layer of honeycomb material and a perforated plate positioned on the discharge side thereof; and FIG. 4 is an enlarged fragmentary plan view of the honeycomb material layer of FIGS. 1 through 3.

Like reference numerals refer to corresponding parts throughout the several views of the drawing.

DETAILED DESCRIPTION

Referring now to the drawing, the nozzle apparatus of the invention is illustrated as being incorporated in a convection oven, generally indicated at 10 in FIG. 1.

A conveyor, generally indicated at 12, transports products, such as thin walled containers 14, on an open mesh or otherwise perforated conveyor belt 16 through the oven 10 and a cooler, stationed beyond the oven exit and generally indicated at 18. The oven may be of a conventional design having one or more stages such as 10a, including separate burners 20 and recirculating fans 22 for supplying suitably heated air to plenum chambers 24. The two plenum chambers are provided with a common discharge face, generally indicated at 26, which lies in a plane parallel to the plane of the conveyor belt 16 closely spaced to the upper ends of the containers 14 moving thereon. A portion of the air discharging onto the containers from discharge face 26 is recirculated by fans 22 and the remainder is exhausted by a common exhaust fan 28 through stack 30. The cooler 18 is provided with an extension 26a, either continuous or separate, of discharge face 26, which extension serves as the discharge face for a plenum chamber 32 through which cooling air is discharged onto the containers exiting from the oven 10. The cooling air is supplied by a fan 34 having an intake stack 36 and an exhaust stack 38.

In accordance with one embodiment of the invention, as best seen in FIGS. 2 and 4, the discharge face 26, as well as extension 26a, consists of a layer of honeycomb material 40. This honeycomb material layer is preferably of conventional construction to provide a multiplicity of elongated, vertically oriented fluid passages or nozzles 42 which controllably direct the air flow from plenum chambers 24 downwardly onto containers 14. Since the honeycomb layer, as mounted to the oven walls 10a by a series of supports 44, lies in a plane parallel to the plane of the conveyor belt 16, the axes of the air passages 42 are aligned with the centerlines of the containers. Assuming that the honeycomb material layer is sufficiently thick so as to provide suitably elongated passages 42, the air flow therefrom is essentially non-turbulent or laminar. Thus there are no lateral components of air flow which would tend to tip the containers over, even when conveyed through the oven and cooler open end up. As a consequence, container stability is preserved, even at higher air flow masses and velocities than have heretofore been practicable.

As an additional embodiment of the invention, a perforated plate 50 having apertures 52 communicating with the passages 42 is situated on the discharge side of the honeycomb material layer 40, as seen in FIG. 4. The size and spacing of the apertures 52 in plate 50 are selected to provide desired distribution and flow velocity of the air impinging on containers 14.

From the foregoing description, it is seen that the present invention provides an extremely practical nozzle apparatus having particular application in convection ovens. The construction and design of the honeycomb layer is not critical, except that it must maintain bond integrity throughout the range of oven temperatures to which it is subjected. Aluminum has been found to be a suitable honeycomb material. The thickness of the honeycomb layer 40 may range from one-half to three inches. Suitable honeycomb layers for use in the present invention have been found to be available "off the shelf" from various manufacturers and of quite low cost, and thus implementation of the invention with or without perforated plate 50, is quite inexpensive, even when retrofitted to existing ovens. Obviously, the honeycomb material is quite light in weight, and thus the nozzle apparatus of the invention adds little weight to the oven. Moreover, by using the instant invention, the discharge face can be positioned in closer relation to the product, thus contributing to a more compact and efficient oven design.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawing shall be interpreted as illustrative and not in a limiting sense.

Having described the invention, what is claimed as new and desire to secure by Letters Patent is:

1. Apparatus for heat treating a series of thin walled container products comprising, in combination:
   A. a conveyor for moving products through said apparatus;
   B. a supply plenum for heat treating fluid;
   C. a discharge face for said plenum arranged in a plane parallel to the plane of the conveyor and in closely spaced relation to the products moving on said conveyor, said discharge face including
      1. a layer of honeycomb material having a plurality of interconnected wall members providing a multiplicity of adjacent, elongated vertically oriented defining a plurality of relatively small nozzles effective to direct fluid flow in a direction normal to the plane of the conveyor for impingement in a non turbulent manner on the products moving therepast.

2. The apparatus defined in claim 1, which further includes
   D. a plate arranged in a plane parallel to the plane of the conveyor and positioned on the discharge side of said honeycomb material layer, said plate formed having
      1. a plurality of distributed apertures therein communicating with said fluid passages and serving as regulating orifices for fluid flow therethrough.

3. The apparatus defined in claim 1, wherein said honeycomb layer is at least one-half inch thick.

4. Apparatus for curing inside coatings on thin-walled, elongated containers, said apparatus comprising, in combination:
   A. a convection oven;
   B. a conveyor for continuously conveying the containers, open end up, through said oven with their elongated axes normal to the plane of said conveyor;
   C. a supply plenum for heated air incorporated in said oven;
   D. a discharge face for said plenum arranged in a plane parallel to the plane of said conveyor and in closely spaced relation above the containers moving on said conveyor through said oven, said discharge face including
      1. a layer of honeycomb material having a plurality of interconnected wall members providing a multiplicity of adjacent, elongated vertically oriented defining a plurality of relatively small nozzles effective to controllably direct essentially non-turbulent fluid flow in a direction essentially parallel to the container axes for impingement in a non-turbulent manner on the containers.

5. The apparatus defined in claim 4, which further includes

E. a plate arranged in a plane parallel to the plane of said conveyor and positioned on the discharge side of said honeycomb material layer, said plate formed having 1. a plurality of distributed apertures therein communicating with said fluid charges and serving as regulating orifices for fluid flow therethrough.

6. The apparatus defined in claim 4, wherein said honeycomb layer is at least one-half inch thick.

* * * * *